United States Patent
Zhang et al.

(10) Patent No.: US 11,277,009 B2
(45) Date of Patent: Mar. 15, 2022

(54) METHOD AND APPARATUS FOR SMOOTHING LINK-LINE POWER OF ELECTROTHERMAL MICROGRID USING THERMAL STORAGE HEAT PUMP

(71) Applicants: State Grid Jiangsu Electric Power CO., LTD Nanjing Power Supply Company, Jiangsu (CN); SHANGHAI JIAO TONG UNIVERSITY, Shanghai (CN); HOHAI UNIVERSITY, Jiangsu (CN); STATE GRID JIANGSU ELECTRIC POWER CO., LTD, JiangSu (CN)

(72) Inventors: Yong Zhang, Jiangsu (CN); Zhoujun Ma, Jiangsu (CN); Ming Zhang, Jiangsu (CN); Wentao Huang, Shanghai (CN); Shigang Dai, Shanghai (CN); Yuping Zheng, Jiangsu (CN); Nengling Tai, Shanghai (CN); Chunning Wang, Jiangsu (CN); Liwei Wang, Jiangsu (CN); Honghua Xu, Jiangsu (CN); Yiru Chen, Jiangsu (CN); Di Ma, Jiangsu (CN)

(73) Assignees: State Grid Jiangsu Electric Power CO., LTD Nanjing Power Supply Company, Jiangsu (CN); SHANGHAI JIAO TONG UNIVERSITY, Shanghai (CN); HOHAI UNIVERSITY, Jiangsu (CN); STATE GRID JIANGSU ELECTRIC POWER CO., LTD, Jiangsu (CN)

(*) Notice: Subject to any disclaimer, the term of this patent is extended or adjusted under 35 U.S.C. 154(b) by 365 days.

(21) Appl. No.: 16/695,533

(22) Filed: Nov. 26, 2019

(65) Prior Publication Data
US 2020/0176989 A1 Jun. 4, 2020

(30) Foreign Application Priority Data

Nov. 29, 2018 (CN) .......................... 201811444435.X

(51) Int. Cl.
*H02J 3/32* (2006.01)
*B01J 19/08* (2006.01)
*B01J 19/10* (2006.01)

(52) U.S. Cl.
CPC ............... *H02J 3/32* (2013.01); *B01J 19/081* (2013.01); *B01J 19/087* (2013.01); *B01J 19/10* (2013.01)

(58) Field of Classification Search
CPC .......... H02J 3/32; B01J 19/081; B01J 19/087; B01J 19/10
See application file for complete search history.

(56) References Cited

U.S. PATENT DOCUMENTS

| 10,969,119 B1* | 4/2021 | Bayoumi | ............ F24D 11/0221 |
| 2014/0236883 A1* | 8/2014 | Ye | ............ H02J 7/345 |
| | | | 706/52 |

FOREIGN PATENT DOCUMENTS

| CN | 106849132 A | 6/2017 |
| CN | 108805328 A | 11/2018 |

(Continued)

OTHER PUBLICATIONS

First Office Action for the Chinese Patent Application No. 201811444435, dated Jul. 5, 2021, 4 pages.

*Primary Examiner* — Jared Fureman
*Assistant Examiner* — Duc M Pham
(74) *Attorney, Agent, or Firm* — Kacvinsky Daisak Bluni PLLC

(57) ABSTRACT

Disclosed are a method and apparatus for smoothing a link-line power of an electrothermal microgrid using a thermal storage heat pump cluster. The method includes:

(Continued)

determining a current link-line power control target and pre-distributing a smoothing task to the heat pump cluster; making, by a heat pump start-stop control layer cluster, a heat pump cluster start-stop scheme, determining a start-stop state of the heat pump cluster and a start-stop smoothing component of the heat pump cluster according to the smoothing task, obtaining a remaining fluctuating power based on link-line fluctuating power and the start-stop smoothing component of the heat pump cluster; smoothing, by a heat pump cluster power adjustment layer, some medium and low frequency components and outputting a smoothing component of the heat pump cluster with respect to a storage battery output optimization target based on the remaining fluctuating power; and simultaneously undertaking, by the storage battery, a smoothing task of the remaining fluctuating power and outputting a storage battery smoothing component to complete the smoothing of the fluctuating power in a control cycle.

7 Claims, 6 Drawing Sheets

(56) References Cited

FOREIGN PATENT DOCUMENTS

| CN | 110458353 A | * | 11/2019 | ............ G60Q 10/04 |
| JP | 2017169349 A | | 9/2017 | |
| WO | WO-2009011254 A1 | * | 1/2009 | ............... G21F 7/00 |

\* cited by examiner (a) Heat pump stopping strategy      (b) Heat pump starting strategy

METHOD AND APPARATUS FOR SMOOTHING LINK-LINE POWER OF ELECTROTHERMAL MICROGRID USING THERMAL STORAGE HEAT PUMP

CROSS-REFERENCES TO RELATED APPLICATIONS

The present application is a U.S. patent application filed herewith which claims the priority of China patent application No. 201811444435.X entitled "Method and Apparatus for Smoothing Link-line Power of Electrothermal Microgrid Using Thermal Storage Heat Pump" and filed on Nov. 29, 2018 to the State Intellectual Property Office of the People's Republic of China, which is hereby incorporated herein by reference in its entirety.

TECHNICAL FIELD

The present disclosure relates to the technical field of electrical power and thermal power and more particular relates to an electrothermal microgrid technique, which includes a method and apparatus for smoothing a link-line power of an electrothermal microgrid using a thermal storage heat pump cluster.

BACKGROUND

An electrothermal microgrid is a type of ultimate integrated energy supply facility composed of a distributed energy source, an energy storage device, an electrothermal device, and a control based on the electric and thermal requirements of an ultimate consumer. The electrothermal microgrid can comprehensively utilize two different energy forms of electricity and heat to improve the reliability and the economy of regional ultimate energy supply. As a large number of distributed renewable energy sources are accessing the microgrid, the intermittence and volatility of renewable energy power generation bring challenges to the stable operation of the microgrid. The electrothermal microgrid adopts key electrothermal conversion technologies such as heat generation using electricity to take the advantages of a quick response of electric energy and ease of thermal energy storage thereby improving the control flexibility and reliability of the operation of the microgrid. The electrothermal microgrid has become scholars' focus of attention.

At present, a large number of researches have proposed battery energy storage for smoothing power fluctuations of the microgrid, including document "*A Control Strategy of Hybrid Energy Storage System Capable of Suppressing Output Fluctuation of Photovoltaic Generation System*" (WANG Haibo, YANG Xiu, ZHANG Meixia. Power System Technology. 2013 (09). Volume 37)"; document "*Hybrid Energy Storage Scheduling based Microgrid Energy Optimization Under Different Time Scales*" (LIU Fang, YANG Xiu, SHI Shansan, ZHANG Meixia, DENG Hong, GUO Pengchao. Power System Technology. 2014 (11)); patent application "*Micro-grid energy management method based on hybrid energy storage and electric automobiles*" (CN107769235A) and patent application "*Method for micro-grid system coordinated control based on multi-element composite energy storage*" (CN104022528A). They all use the hybrid energy storage made up of power type energy storage and energy type energy storage as a control object to achieve output optimization by different control methods. However, the high costs of battery storage limit the technical economy of its application.

In the electrothermal microgrid, a thermal controlled load (TCL) with a good controlled characteristic such as an air conditioner and an electric heat pump can effectively smooth the power fluctuations. Document "*A Hierarchical and Distributed Control Strategy of Thermostatically Controlled Appliances for City Park based on Load model Prediction*" (WEI Wenting, WANG Dan, JIA Hongjie, WANG Ran, GUO Bingqing, QU Bo, FAN Menghua. Proceedings of the CSEE. 2016 (08)) provides a control strategy for thermostatically controlled appliances based on the load model prediction in which power of a heat pump cluster is controlled through a variable temperature control strategy to match the fluctuations of renewable energy, but the coordination with battery energy storage is not considered. Document "*A Coordination Control Strategy of Battery and Virtual Energy Storage to Smooth the Micro-grid Link-line Power Fluctuations*" (WANG Ran, WANG Dan, JIA Hongjie, YANG Zhaoyong, QI Yebai, FAN Menghua, SHENG Wanxing, HOU Lirui, Proceedings of the CSEE. 2015 (20)) provides an index priority list (IPL) to construct a heat pump model and sets a heat pump start-stop condition to avoid repeated start-stop. However, the control of the heat pump is monotonous and the overall start-stop frequency of the heat pump cluster is not optimized. Document "*A Link-line Power Smoothing Method for Microgrid Using Residential Thermostatically-controlled Loads*" (WANG Chengshan, LIU Meng, LU Ning. Proceedings of the CSEE. 2012 (25)) coordinates hybrid energy storage and the output of the heat pump cluster based on an algorithm for controlling the heat pump cluster. However, residential buildings are used as virtual thermal energy storage, which imposes a great limitation on the control of the heat pump cluster. Patent application "*Group control heat pump-based power fluctuation smoothing method and system for micro-grid link line*" (CN106849132A) smooths power fluctuations taking into account the power regulation of the heat pump, but the power regulation and control model is simplistic and the coordination with the output of a storage battery is not considered.

SUMMARY

An object and a problem to be solved of the present disclosure are described below.

(1) In view of the high operation costs of battery energy storage, electric energy and thermal energy are coupled in a microgrid, and partial electric energy storage is replaced with distributed thermal energy storage to implement an economical operation of the microgrid. There is thus a need to propose a corresponding microgrid control method.

(2) In view of the lack of a thorough research on the control of an electrothermal coupling device and the lack of a mature control model in the existing art, the present disclosure deeply analyzes the characteristics of a thermal storage heat pump, fully considers operational characteristics of the heat pump and thermal storage characteristics of a thermal storage water tank matching the heat pump, and establishes a thermal storage heat pump control model.

(3) The traditional cluster control algorithm has inconsistent heat pump losses due to differentiated conditions of thermal storage heat pumps participating in power regulation and control, such as different rated powers of the heat pumps, different volumes of matching water tanks and different thermal loads of users, enthusiasm and fairness of the users are difficult to ensure. The object of the present disclosure is to achieve consistent adjustment of losses of a heat pump cluster and reduce strategy implementation costs.

(4) In a traditional method, control of the heat pump cluster and control of an output of a storage battery are difficult to coordinate with each other due to different response time characteristics. The present disclosure establishes a heat pump cluster power adjustment model, this enabling the heat pump cluster to smooth medium frequency fluctuations, and assists the storage battery in reducing battery losses.

The technical scheme of the present disclosure is as follows: a method for smoothing a link-line power of an electrothermal microgrid using a thermal storage heat pump cluster, the method including determining a link-line power control target of the microgrid, a heat pump cluster start-stop control layer, a heat pump cluster power adjustment layer, and a storage battery smoothing adjustment. A link-line power control cycle is divided into a number of $T_D$ time points, let k denote discrete time, where $k \in [1, T_D]$ then each control cycle includes the following steps.

(1) A current link-line power control target $P_{Tar}[k]$ is determined based on an original link-line power $P_{TLO}[k]$ and an energy storage state $SOC_{all}[k-1]$ of the storage battery and the heat pump cluster at a last time point, link-line fluctuating power $P_{flu}[k]$ is obtained based on $P_{Tar}[k]$ in conjunction with the original link-line power $P_{TLO}[k]$, and the fluctuating power is then subjected to low-pass filtering before a smoothing task $P_{fl\_HP}[k]$ is pre-distributed to the heat pump cluster based on the energy storage state of the storage battery and the heat pump cluster.

(2) A heat pump start-stop control layer cluster makes a heat pump cluster start-stop scheme, and a start-stop state $s_i[k]$ of the heat pump cluster and a heat pump cluster start-stop smoothing component $P_{HP\_sw}[k]$ are determined according to $P_{fl\_HP}[k]$, where i is a reference number of the heat pump.

(3) A remaining fluctuating power $P_{flu\_rem}[k]$ is obtained based on the link line fluctuating power $P_{flu}[k]$ and the heat pump cluster start-stop smoothing component $P_{HP\_sw}[k]$, the heat pump cluster power adjustment layer smooths some medium and low frequency components and determines a heat pump cluster power adjustment smoothing component $P_{HP\_adj}[k]$ for a storage battery output optimization target based on $P_{flu\_rem}[k]$, the heat pump cluster start-stop smoothing component $P_{HP\_sw}[k]$ and the heat pump cluster power adjustment smoothing component $P_{HP\_adj}[k]$ are combined and entered into the heat pump cluster to output a heat pump cluster smoothing component $P_{HP\_f}[k]$.

(4) The storage battery simultaneously undertakes a smoothing task of the remaining fluctuating power, the heat pump cluster start-stop smoothing component $P_{HP\_sw}[k]$ and the heat pump cluster power adjustment smoothing component $P_{HP\_adj}[k]$ are combined with the link-line fluctuating power $P_{flu}[k]$ and then entered into the storage battery to output a storage battery smoothing component $P_{ess}[k]$ to complete the smoothing of the fluctuating power in the control cycle.

The present disclosure further provides an apparatus for implementing the foregoing method for smoothing a link-line power of an electrothermal microgrid using a thermal storage heat pump cluster. The apparatus includes a strategy information collection module, a heat pump cluster start-stop control strategy module, a heat pump cluster power adjustment strategy module, and a storage battery power adjustment strategy module. These modules are computer storage media, configured to store a computer program which, when executed, implements the method described below.

The strategy information collection module acquires an input signal required by the smoothing method from a microgrid energy management system, where the input signal includes an original link-line power and an energy storage state of the storage battery and the heat pump cluster at a last time point, thus implementing the above-described step (1).

The heat pump cluster start-stop control strategy module implements step (2).

The heat pump cluster power adjustment strategy module implements step (3).

The storage battery power adjustment strategy module implements step (4).

Output information of the heat pump cluster start-stop control strategy module, the heat pump cluster power adjustment strategy module and the storage battery power adjustment strategy module is entered into the microgrid energy management system for the electrothermal microgrid to control the storage battery and the heat pump cluster so as to smooth the link-line power.

The present disclosure has the following beneficial effects:

(1) The present disclosure fully considers a heat pump and a matching thermal storage water tank, establishes a control model based on the thermal storage heat pump for the first time, and performs cluster control by use of the distributed heat pump cluster and thermal storage cluster to coordinate with the storage battery to smooth link-line power fluctuations of the microgrid.

(2) The present disclosure designs a strategy structure of fluctuating power distribution and smoothing using the storage battery coordinating with the thermal storage of the heat pump cluster, and replaces the partial battery energy storage with the existing distributed thermal storage in the electrothermal microgrid, greatly reducing costs of the microgrid on the fluctuating power smoothing.

3) Based on a greedy algorithm, the present disclosure designs a method for quickly making a heat pump cluster smoothing control strategy, which has no limit on the characteristics of the heat pump and the thermal storage characteristics participating in the power adjustment thereby providing strong practicability. Meanwhile, the present disclosure further solves the problems of initiative and enthusiasm of the heat pump cluster to actively participate in the smoothing, achieves consistency of losses of the heat pump cluster by designing a simulated annealing optimization algorithm, which is beneficial to overall maintenance and fairness of the heat pump cluster in the microgrid. The control strategy in the method of the present disclosure fully considers differentiated factors of the rated powers of the heat pumps, the volumes of water tanks, the thermal loads of the users and the like, combines the greedy algorithm with the simulated annealing algorithm, thereby achieving more effective optimization and control of the heat pump cluster with different characteristics while providing superior robustness.

(4) In view of simplification of communication, the heat pump start-stop states as well as other conditions, the present disclosure adopts a more refined heat pump cluster power adjustment control method and the heat pump cluster power adjustment closely cooperates with the output of the storage battery to optimize the output of the storage battery. The control strategy in which the power adjustment of the heat pump cluster closely cooperates with the output of the storage battery designed by the present disclosure fully considers power adjustment characteristics of the heat pump and assists the storage battery in reducing charge-discharge conversion cycles, thus reducing operation costs of the microgrid.

(5) In a practical test of the apparatus, the present disclosure achieves consistency of losses of the heat pumps with different characteristics while the link-line power fluctuations are effectively smoothed, thereby effectively reducing the charge-discharge conversion cycles of the storage battery, and reducing the operation costs.

DETAILED DESCRIPTION

The present disclosure provides a method and apparatus for smoothing a link-line power of an electrothermal microgrid using a thermal storage heat pump cluster. An implementation of the present disclosure is described in detail below.

1. Electrothermal Coupling Model

Figure 1:
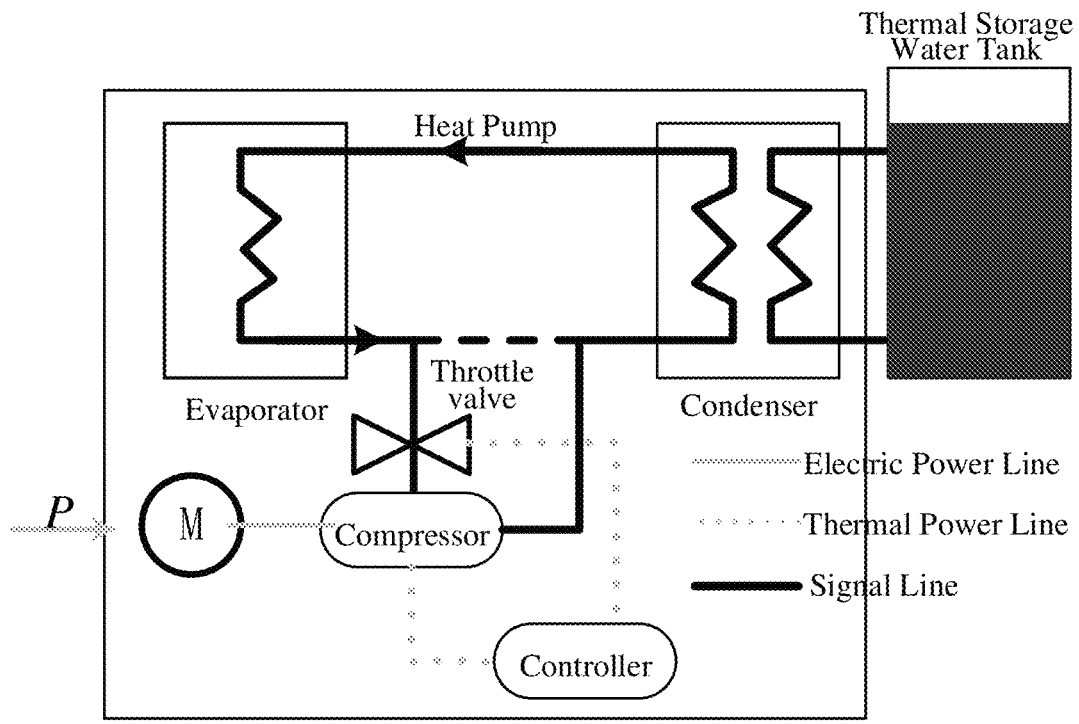
FIG. 1 is a structural diagram of a heat pump system including a thermal storage water tank.

A structure of a heat pump system including a thermal storage water tank is shown in FIG. 1. A heating cycle of a heat pump includes an evaporator, a condenser, a compressor, and a throttle valve. After the heat pump generates high-quality thermal energy, a thermal storage water tank is used as a buffer to supply a user with heat through a heat supply cycle. For an i-th heat pump at a time point t, $P_i(t)$ denotes an electric power consumed by the heat pump, $Q_i(t)$ denotes a heating power of the heat pump, and $COP_{HP}$ denotes an energy efficiency ratio coefficient of the heat pump, namely a ratio of thermal energy generated by the heat pump to electric energy consumed by the heat pump. The heating cycle of the heat pump meets the following formula:

$$Q_i(t) = COP_{HP} \cdot P_i(t) \quad (1)$$

When the heat pump is operating, an opening degree of the throttle valve and a real-time rotational speed of the compressor are adjusted through a controller to adjust power $P_i(t)$ consumed by the heat pump within a certain margin. A start-stop state of the i-th heat pump is denoted by $s_i(t)$, where 0 denotes a closed state and 1 denotes a started state. Assuming that $P_{i\_N}$ denotes a rated working power of the heat pump, $P_{i\_adj}(t)$ denotes a power adjustment amount of the i-th heat pump, $\eta$ is a maximum adjustable proportion of the power adjustment of the heat pump and represents an adjustable margin of a dynamic power of the heat pump, namely the rated power multiplied by a proportional coefficient is a power adjustment range of the heat pump. The proportional coefficient is denoted by $\eta$. $\eta P_{i\_N}$ denotes a maximum adjustable power margin. A control model of the heat pump is as shown in the following formula (2):

$$\begin{cases} P_i(t) = \begin{cases} P_{i\_N} + P_{i\_adj}(t), & s_i(t) = 1 \\ 0, & s_i(t) = 0 \end{cases} \\ |P_{i\_adj}(t)| < \eta P_{i\_N} \end{cases} \quad (2)$$

The thermal storage water tank has a good thermal insulation property, and a water temperature change of the water tank is simulated with natural losses ignored, as shown in the following formula (3), where $Q_{Li}(t)$ is a thermal load of a user corresponding to the heat pump, $V_i$ is a water storage volume, $\rho_w$ is a water density, $c_w$ is specific heat of water, $R_i$ is a thermal resistance of the water tank, $dT_{wi}(t)/dt$ is a water temperature change rate, and $T_{wi}(t)$ is water temperature. To meet the user's demand for heat, the water temperature cannot be lower than minimum temperature $T_{Min}(t)$, which varies with time. Meanwhile, the water temperature cannot be higher than maximum temperature $T_{Max}$ due to design requirements of the heat pump and the thermal storage water tank.

$$\begin{cases} Q_i(t) - Q_{Li}(t) = V_i \rho_w c_w \cdot \dfrac{dT_{wi}(t)}{dt} \\ T_{Min}(t) \le T_{wi}(t) \le T_{Max} \end{cases} \quad (3)$$

The heat pump and the matching thermal storage water tank perform thermal energy storage, which is similar to a definition of a state of charge (SOC) of battery energy storage, and a thermal energy storage state $SOC_i(t)$ is defined by the water temperature, as shown in a formula (4). Meanwhile, an average energy storage state $\overline{SOC}_{HP}$ of the thermal energy storage is obtained by weighting and averaging water storage volumes of various water tanks as weights. Apparently, $SOC_i(t)$ of the thermal energy storage is affected by the minimum water temperature $T_{Min}(t)$ so that a microgrid control center smoothly adjusts a value of $T_{Min}(t)$ according to the user's requirement on the minimum water temperature to implement a smooth operation.

$$\begin{cases} SOC_i(t) = (T_{wi}(t) - T_{Min}(t))/(T_{Max} - T_{Min}(t)) \\ \overline{SOC}_{HP}(t) = \sum_{i=1}^{N} V_i \cdot SOC_i(t) / \sum_{i=1}^{N} V_i \end{cases} \quad (4)$$

For each heat pump, the microgrid control center may directly control the start-stop state of the heat pump and transmit an adjustment proportion order ε(t)(|ε(t)|<η) to an operating heat pump. A local controller of each heat pump responds to the order and adjusts its operating power so that a load of the heat pump cluster is inconsistent with the practical thermal load $Q_L(t)$ of the user, and a difference is fluctuating power matched with a heat pump cluster smoothing component, as shown in the following formula (5):

$$P_{HP\_f}(t) = \sum_{i=1}^{N} (P_{i\_N} + P_{i\_adj}(t)) \cdot s_i(t) - Q_L(t)/COP_{HP}. \quad (5)$$

2. Link-Line Control Target of an Electrothermal Microgrid

Link-line power of the electrothermal microgrid includes an output of a renewable energy source, a output of a storage battery, a load of a heat pump cluster and an electric load of a user. $P_{TL}(t)$ denotes the link-line power of the microgrid, $P_{Wind}(t)$ and $P_{PV}(t)$ respectively denote wind power and a photovoltaic output, $P_{ess}(t)$ denotes charge or discharge power of the storage battery which is positive when the storage battery is charged and negative when the storage battery discharges. $P_L(t)$ denotes the electric load, and $P_{HP}(t)$ denotes the load of the heat pump cluster. Power flowing out of the microgrid is defined as positive, and at the time point t, the link-line power of the microgrid is shown in the following formula (6):

$$P_{TL}(t) = -P_{Wind}(t) - P_{PV}(t) + P_{ess}(t) + P_L(t) + P_{HP}(t) \quad (6)$$

In the present disclosure, when a microgrid control center does not perform adjustment and the load of the heat pump cluster accurately tracks the thermal load of the user, the link-line power is recorded as original link-line power $P_{TLO}(t)$, as shown in the following formula (7). Fluctuating power mainly results from fluctuations of the renewable energy source, and an exponential smoothing method of a variable parameter is adopted to perform low-pass filtering and determine a link-line power control target.

$$P_{TLO}(t) = -P_{Wind}(t) - P_{PV}(t) + P_L(t) + Q_L(t)/COP_{HP} \quad (7)$$

A smoothing filter algorithm divides a whole control cycle into a number of $T_D$ time points, k denotes discrete time, and $k \in [1, T_D]$, and the link-line power control target is recurred according to the following formula (8). Since practical control is discrete, a continuous time variable t is replaced with a discrete time point in the following description.

$$P_{Tar}[k] = (1 - m[k]) P_{Tar}[k-1] + m[k] \cdot P_{TLO}[k] \quad (8);$$

where $P_{Tar}[k]$ is the link-line power control target, $P_{Tar}[k-1]$ is a control target at a last time point, $P_{TLO}[k]$ is the original link-line power at a current time point; and m is a variable exponential smoothing parameter. When m increases, a capability of tracking link-line real-time power is enhanced and the fluctuating power to be stabilized is reduced; when m decreases, a curve of the link-line power control target is smoother.

At each of the $T_D$ time points, a difference between the original link-line power and the link-line power control target is taken as the fluctuating power, and the fluctuating power at a time point k is calculated according to the following formula (9):

$$P_{flu}[k] = P_{Tar}[k] - P_{TLO}[k] \quad (9).$$

3. Link-Line Power Stabilization Strategy of the Electrothermal Microgrid

3.1 Overall Structure of the Stabilization Strategy

Figure 2:
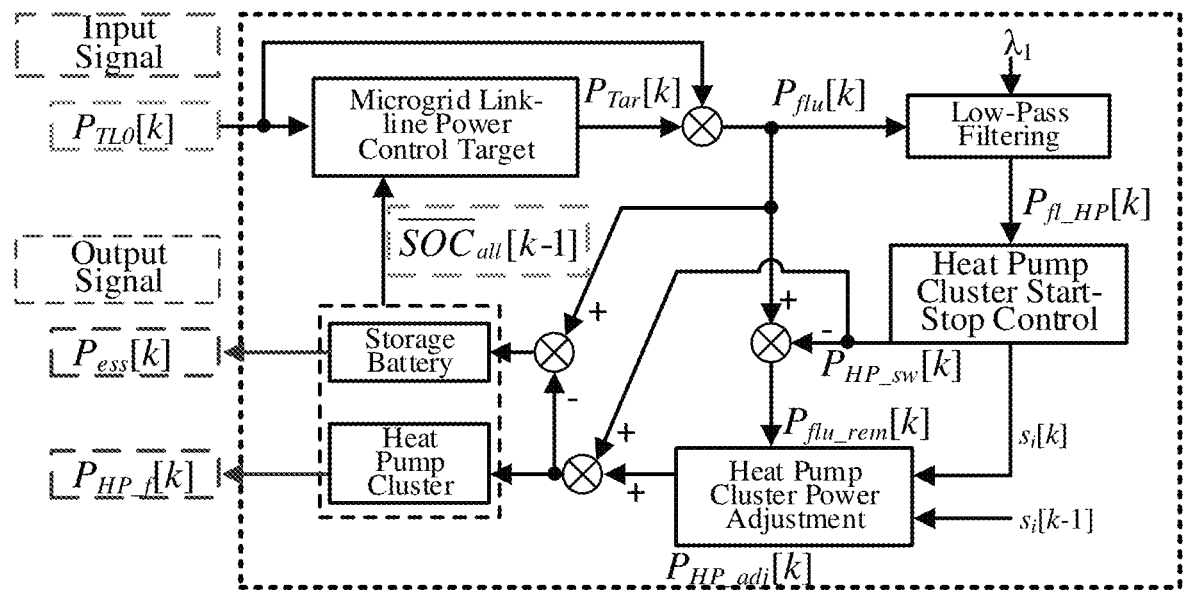
FIG. 2 is a schematic diagram of a strategy structure of a smoothing method in accordance with the present disclosure.

A structure of the link-line power stabilization strategy of the electrothermal microgrid is illustrated in FIG. 2. The overall structure includes determining a link-line power control target of the microgrid, a heat pump start-stop control layer, a heat pump cluster power adjustment layer of a, and a storage battery smoothing adjustment. Each control cycle includes the following steps.

(1) A current link-line power control target $P_{Tar}[k]$ is determined based on original link-line power $P_{TLO}[k]$ and an energy storage state $SOC_{all}[k-1]$ of the storage battery and the heat pump cluster at a last time point, link-line fluctuating power $P_{flu}[k]$ is obtained based on $P_{Tar}[k]$ in conjunction with the original link-line power $P_{TLO}[k]$, and the fluctuating power is then subjected to low-pass filtering before a smoothing task $P_{fl\_HP}[k]$ is pre-distributed to the heat pump cluster according to the energy storage state of the storage battery and the heat pump cluster.

(2) A heat pump start-stop control layer cluster makes a heat pump cluster start-stop scheme, and a start-stop state $s_i[k]$ of the heat pump cluster and a heat pump cluster start-stop smoothing component $P_{HP\_sw}[k]$ are determined according to $P_{fl\_HP}[k]$, where i is a reference number of the heat pump.

(3) A remaining fluctuating power $P_{flu\_rem}[k]$ is obtained based on the link line fluctuating power $P_{flu}[k]$ and the heat pump cluster start-stop smoothing component $P_{HP\_sw}[k]$, the heat pump cluster power adjustment layer smooths some medium and low frequency components and determines a heat pump cluster power adjustment smoothing component $P_{HP\_adj}[k]$ with respect to an storage battery output optimization target based on $P_{flu\_rem}[k]$, the heat pump cluster start-stop smoothing component $P_{HP\_sw}[k]$ and the heat pump cluster power adjustment smoothing component $P_{HP\_adj}[k]$ are combined and entered into the heat pump cluster to output a heat pump cluster smoothing component $P_{HP\_f}[k]$.

(4) The storage battery simultaneously undertakes a smoothing task of the remaining fluctuating power, the heat pump cluster start-stop smoothing component $P_{HP\_sw}[k]$ and the heat pump cluster power adjustment smoothing component $P_{HP\_adj}[k]$ are combined with the link-line fluctuating power $P_{flu}[k]$ and then entered into the storage battery to output a storage battery smoothing component $P_{ess}[k]$ to complete the smoothing of the fluctuating power in the control cycle.

3.2 Smoothing Task Pre-Distributed to the Heat Pump Cluster

Since the heat pump starts slowly, and the heat pump is frequently controlled to start and stop with great losses of a service life of the heat pump, the heat pump cluster start-stop control is used for smoothing only low frequency fluctuating power in the present disclosure. $\lambda_1$ denotes a low-pass filter constant and $\Delta t$ denotes a control time cycle so that the low frequency fluctuating power is recurred according to the following formula (10):

$$P_{fl}[k] = \frac{\lambda_1}{\Delta t + \lambda_1} P_{fl}[k-1] + \frac{\Delta t}{\Delta t + \lambda_1} P_{flu}[k]. \quad (10)$$

Meanwhile, to coordinate an output of the storage battery and an output of the heat pump cluster, the low frequency fluctuating power is distributed according to the energy storage states of the storage battery and the heat storage cluster as shown in the following formulas (11) and (12):

$$\begin{cases} P_{fl\_HP}[k] = \dfrac{1}{1+x} P_{fl}[k] \\ x = \begin{cases} \beta SOC_{ess}/\overline{SOC}_{HP} \\ \beta(1 - SOC_{ess})/(1 - \overline{SOC}_{HP}) \end{cases} \end{cases} \quad (11)$$

$$\beta = \dfrac{S_{ess}}{S_{HP}/COP_{HP}} \quad (12)$$

where β is a capacity ratio of the storage battery to the heat pump cluster, $S_{ess}$ is a capacity of the storage battery, and $S_{HP}$ is a heat capacity of the heat pump cluster.

3.3 Heat Pump Start-Stop Control Layer Cluster

Figure 3:
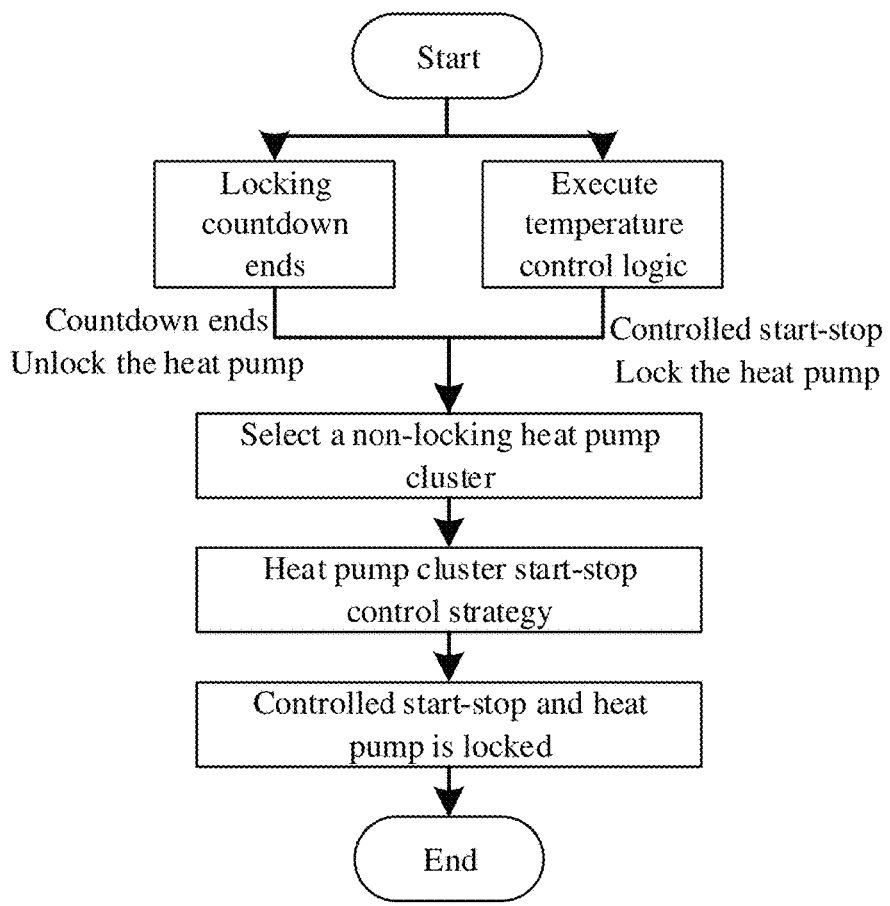
FIG. 3 is a flowchart illustrating a heat pump cluster start-stop control in a smoothing method in accordance with the present disclosure.

A flow of a heat pump start-stop control layer in a single control cycle is illustrated in FIG. 3. Temperature control logic is not restricted by locking, and a restriction of the locking does not conflict with the heat pump cluster start-stop control strategy.

After the smoothing task pre-distributed to the heat pump cluster is acquired, the heat pump start-stop control layer cluster selects a heat pump to start and stop the heat pump and changes a load of the heat pump cluster to meet a fluctuation smoothing requirement. A change amount $\Delta P_{HP}$ of the load of the heat pump cluster is obtained according to the following formula (13). $P_{HP,N}[k-1]$ is the load of the heat pump cluster without considering power adjustment of the heat pump. The heat pump cluster start-stop control strategy is divided into two parts, to formulate the start-stop scheme based on a water temperature index and to optimize the start-stop scheme for a start-stop frequency consistency of the heat pump.

$$\Delta P_{HP} = (Q_L[k]/COP_{HP} + P_{fl\_HP}[k]) - P_{HP,N}[k-1] \quad (13)$$

Figure 4:
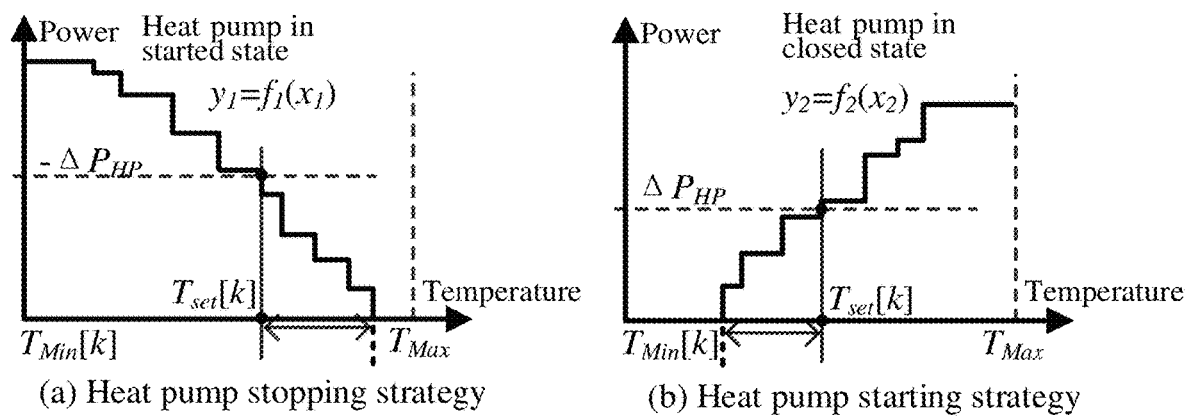
FIG. 4 is a schematic diagram of a heat pump cluster start-stop control strategy in a smoothing method in accordance with the present disclosure.

In a first part of the start-stop control strategy, a greedy algorithm is adopted: a heat pump with a higher water temperature is preferentially stopped when a heat pump needs to be stopped, and a heat pump with a lower water temperature is preferentially started when a heat pump needs to be started. A heat pump statistical curve illustrated in FIG. 4 is drawn by collecting information of a heat pump in a non-locking state, and the heat pump cluster start-stop scheme is quickly made. In FIG. 4, the heat pump in the non-locking state is divided into a set of heat pumps in a started state and a set of heat pumps in a closed state, where an abscissa is temperature and an ordinate is power. When $\Delta P_{HP}<0$, the heat pump needs to be stopped and information of the heat pump in the started state is collected. As illustrated in FIG. 4(a), for any point $(x_1, y_1)$ on the curve, $y_1$ denotes a sum of rated power of heat pumps with water temperature higher than $x_1$. When $\Delta P_{Hp}>0$, the heat pump needs to be started and information of the heat pump in the closed state is collected. As illustrated in FIG. 4(b), for any point $(x_2, y_2)$ on the curve, $y_2$ denotes a sum of rated power of heat pumps with water temperature lower than $x_2$. After temperature $T_{set}$ at an intersection is acquired, and a heat pump in a temperature interval is stopped or started to change the load of the heat pump cluster.

Considering differentiated factors such as the rated power of the heat pump, a capacity of the water tank matching the heat pump, and thermal requirements of different users, the obtained start-stop scheme is further optimized by designing a simulated annealing algorithm. An optimization target is set without increasing charge-discharge conversion cycles of the storage battery and average start-stop cycles of the heat pump, as shown in the following formula (14):

$$fit = \text{varience} + \gamma (P_{fl\_HP}[k] - P_{HP\_sw}[k])^2 \quad (14)$$

where varience and $P_{HP\_sw}[k]$ are respectively a variance of start-stop cycles of the heat pump and the start-stop smoothing component of the heat pump cluster after the current start-stop scheme is adopted, $P_{HP\_sw}[k]$ is shown in the following formula (15), and γ is a weight constant.

$$P_{HP\_sw}[k] = \sum_{i=1}^{N} P_{i\_N} \cdot s_i[k] - Q_L[k]/COP_{HP}. \quad (15)$$

3.4 Heat Pump Cluster Power Adjustment Layer

Power adjustment control of the heat pump cluster has a higher response speed and lower implementation costs. The charge-discharge conversion cycles of the storage battery are optimized through the power adjustment control of the heat pump cluster. After a start-stop control scheme of the heat pump cluster is determined, the remaining fluctuating power is calculated according to the following formula (16), and a pre-output target $P_{ref}[k]$ of power adjustment of the heat pump cluster is as shown in the following formula (17):

$$P_{flu\_rem}[k] = P_{flu}[k] - P_{HP\_sw}[k] \quad (16)$$

$$\begin{cases} P_{ref}[k] = P_1[k] - P_2[k] \\ P_1[k] = (1-a)P_1[k-1] + aP_{flu\_rem}[k] \\ P_2[k] = (1-a+b[k])P_2[k-1] + (a-b[k])P_{flu\_rem}[k] \end{cases} \quad (17)$$

where $P_1[k]$ and $P_2[k]$ are first-order exponential smoothing of the remaining fluctuating power, a is an exponential smoothing constant, and b[k] is a variable smoothing parameter. The parameter b[k] is adjusted as shown in the following formula (18). When the remaining fluctuating power is lower than a threshold constant $P_{th}$ and approaches 0, b[k] is increased to generate a power adjustment output of the heat pump cluster so that the storage battery stays in a charge or discharge state and does not need to continually convert between the charge and discharge states due to power fluctuations.

$$b[k] = \begin{cases} a(1 - P_{flu\_rem}[k]/P_{th})^2, & |P_{flu\_rem}[k]| < P_{th} \\ 0, & \text{otherwise} \end{cases} \quad (18)$$

Figure 5:
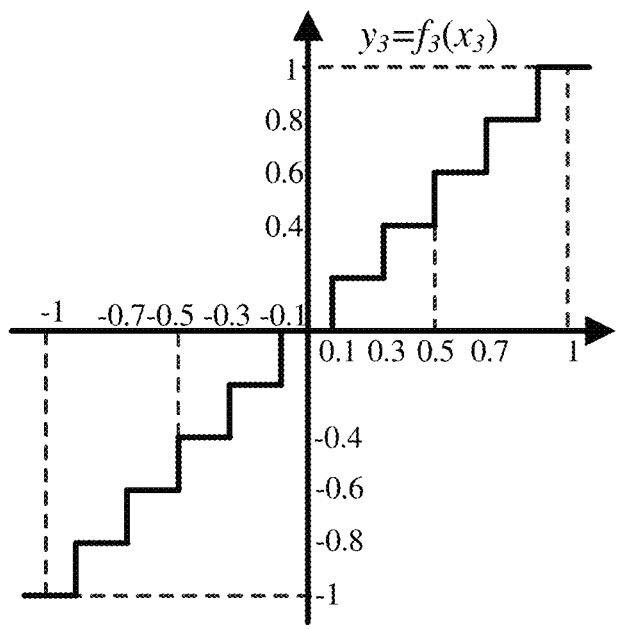
FIG. 5 is a diagram illustrating an amplitude limiting step function in a smoothing method in accordance with the present disclosure.
Figure 6:
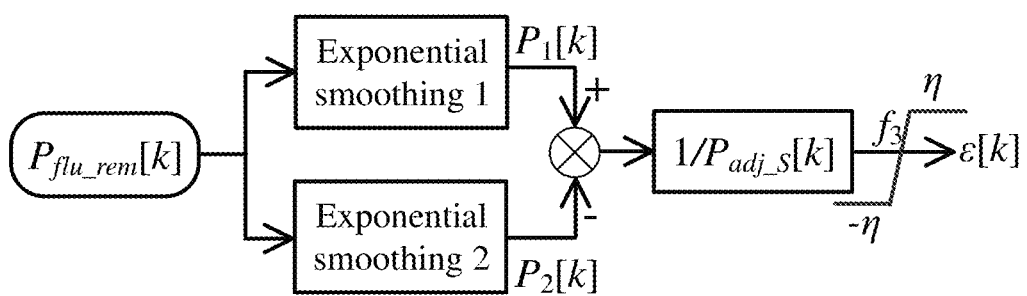
FIG. 6 is a structural diagram illustrating a heat pump cluster power adjustment strategy in accordance with the present disclosure.

Meanwhile, a power adjustment margin of the heat pump cluster is limited by the start-stop state of the heat pump. Therefore, in the control strategy, an adjustable capacity $P_{adj\_S}$ of the heat pump cluster is determined and an adjustment proportion order ε[k] is determined according to the pre-output target, as shown in the following formula (19). To simplify a control mode, a final output signal is discretized with an amplitude limiting step function. The amplitude limiting step function $f_3$ is shown in FIG. 5. A local controller of the heat pump responds to the order to complete power adjustment. A power adjustment control structure of the heat pump cluster is shown in FIG. 6.

$$\begin{cases} P_{adj\_S}[k] = \sum_{i=1}^{N} P_{i\_N} \cdot s_i[k] \cdot s_i[k-1] \\ \varepsilon[k] = f_3\left(\dfrac{P_{ref}[k]/P_{adj\_S}[k]}{\eta}\right)\eta \end{cases} \quad (19)$$

The power adjustment smoothing component of the heat pump cluster is as shown in the following formula (20). Finally, control of the heat pump cluster in the control cycle is completed and in step (4), the output of the storage battery is adjusted to smooth the remaining fluctuating power.

$$P_{HP\_adj}[k]=\varepsilon[k] \cdot P_{adj\_S}[k] \quad (20)$$

4. Modules of an Apparatus

Based on a specific implementation of the preceding method, the present disclosure further provides modules of an apparatus to which a microgrid energy management system can be applied, that is, an apparatus for implementing the preceding method for smoothing a link-line power of an electrothermal microgrid using a thermal storage heat pump cluster. The apparatus includes a strategy information collection module, a heat pump cluster start-stop control strategy module, a heat pump cluster power adjustment strategy module, and a storage battery power adjustment strategy module. These modules are computer storage media, configured to store a computer program which, when executed, implements the method described below.

The strategy information collection module acquires an input signal required by the smoothing method from the microgrid energy management system, where the input signal includes an original link-line power and an energy storage state of the storage battery and the heat pump cluster at a last time point, thus implementing the above-described step (1) in the overall structure of the stabilization strategy.

The heat pump cluster start-stop control strategy module implements step (2) in the overall structure of the stabilization strategy.

The heat pump cluster power adjustment strategy module implements step (3) in the overall structure of the stabilization strategy.

The storage battery power adjustment strategy module implements step (4) in the overall structure of the stabilization strategy.

Output information of the heat pump cluster start-stop control strategy module, the heat pump cluster power adjustment strategy module and the storage battery power adjustment strategy module is entered into the microgrid energy management system for the electrothermal microgrid to control the storage battery and the heat pump cluster so as to smooth link-line power.

It is apparent to those skilled in the art that the method of the present disclosure needs to be implemented by a combination of software and hardware. The control strategy relies on an intelligent measurement system, a control terminal, and other devices to achieve the expected effects. Therefore, the apparatus of the present disclosure may be implemented based on various computer storage media, such as a floppy disk, a USB flash disk, and a hard disk, or by being directly embedded into the microgrid energy management system in a form of a software program installation package.

Figure 7:
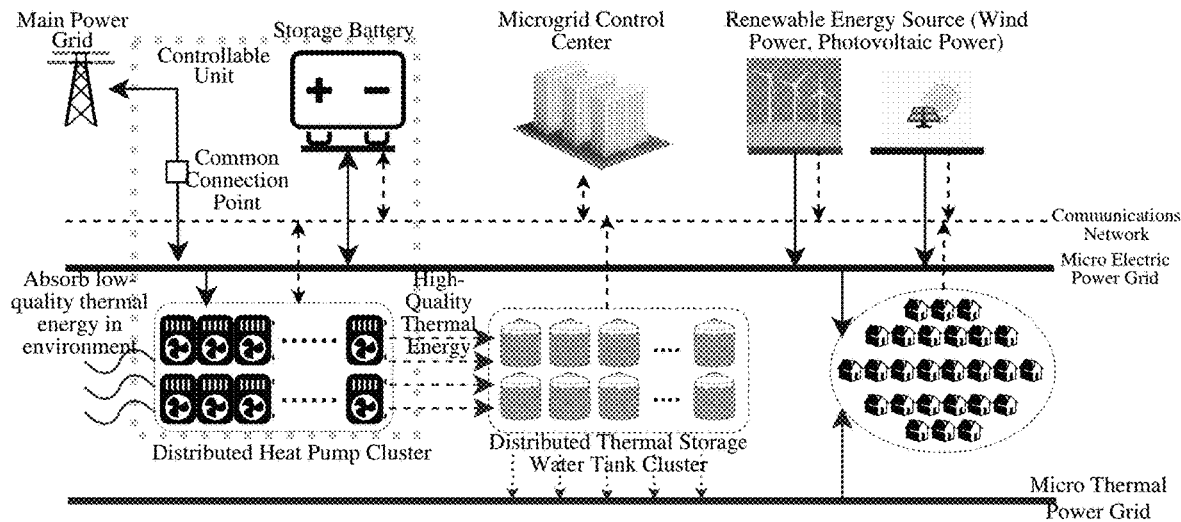
FIG. 7 is a schematic diagram illustrating a structure of an electrothermal microgrid with electric and thermal energy flows.
Figure 8:
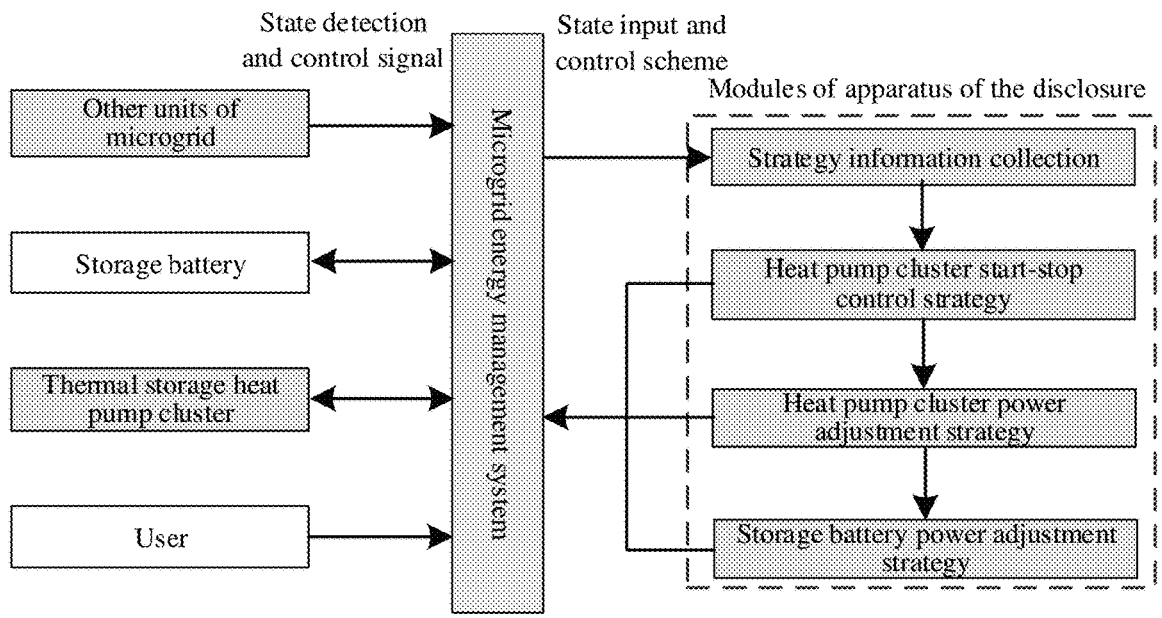
FIG. 8 is a schematic diagram illustrating an apparatus of the present disclosure arranged in an electrothermal microgrid.

As illustrated in FIG. 7, a typical result of the microgrid in practical engineering is divided into a micro electric power grid and a micro thermal power grid in terms of energy, that is, the electrothermal microgrid. The microgrid energy management system is installed in a microgrid control center and belongs to the existing art, which is not to be described in detail here, and the modules of the apparatus of the present disclosure are embedded in a manner as illustrated in FIG. 8. The microgrid energy management system is a center for detecting microgrid devices and control devices, and acquires a control scheme by inputting states to the modules of the apparatus of the present disclosure, so as to implement an optimized operation of the microgrid.

5. Embodiment Test

An electro thermal microgrid mainly includes wind power, a photovoltaic renewable energy source, a storage battery, and user loads. The user loads include 250 heat pumps each of which is provided with a thermal storage water tank to supply users with heat.

TABLE 1

System parameters of the electrothermal microgrid

| | Parameter | Value |
|---|---|---|
| Parameters of the storage battery | Capacity $S_{ess}$(kWh) of the storage battery | 300 |
| | Charge or discharge power limit of the storage battery (kW) | 120 |
| Parameters of the heat pump | Number of heat pumps | 250 |
| | Energy efficiency coefficient $COP_{HP}$ | 3.5 |
| | Maximum power adjustment ratio $\eta$ | 0.1 |
| | Start-stop locking time (min) | 30 |
| Parameters of the water tank | Maximum temperature $T_{Max}$ (° C.) | 60 |
| | Minimum temperature (° C.) from 0:00 to 19:00 | 30 |
| | Minimum temperature (° C.) from 19:00 to 24:00 | 35 |
| | Thermal conductivity of a heat-insulating layer of a tank body (W/m · ° C.) | 0.06 |
| | Thickness of the heat-insulating layer of the tank body | 60 |
| Control parameters | Link-line smoothing parameter m from 0:00 to 15:00 | 0.05 |
| | Link-line smoothing parameter m from 15:00 to 24:00 | 0.01 |
| | Fluctuating low-pass filter constant $\lambda 1$ | 9 |
| | Control time interval $\Delta t$(min) | 1 |
| Simulation parameters | Electric power data sampling interval (s) | 15 |
| | Thermal load data sampling interval (s) | 60 |
| | Simulation time (min) | 1440 |

Based on a simulation data example, a link-line power smoothing effect is illustrated in the following table 2. Fluctuating power within 10 min is a difference between a maximum power value and a minimum power value within the 10 min, as shown in formulas (21) and (22). The formula (21) is a definition of the fluctuating power within 10 min, that is, a difference between maximum link-line power and minimum link-line power within any 10 min. The larger the value, the larger the fluctuating power in this period. The formula (22) is a sum of the fluctuating power within 10 min over a period of time, and is used for evaluating a link-line power smoothing effect over a long period of time. The larger the value, the larger the fluctuating power. The fluctuating power within 10 min of each simulation node in a simulation period is recorded, and a maximum value and a sum from 0 h to 24 h are collected, as shown in the table 2. The maximum value of the fluctuating power within 10 min represents a local maximum fluctuation of a power curve, which decreases by 29.78%. The sum of the fluctuating power within 10 min from 0 h to 24 h represents an overall fluctuation situation of the power curve, which decreases by 32.85%. A simulation result shows that link-line fluctuating power is effectively smoothed.

TABLE 2

Fluctuating power within 10 min before and after the link-line power is smoothed

| Parameter | Before smoothing | After smoothing | Decrease proportion |
|---|---|---|---|
| Maximum value of the fluctuating power within 10 min (kW) | 96.28 | 67.61 | 29.78% |
| (0-24 h) Sum of the fluctuating power within 10 min (kW) | 46211 | 31030 | 32.85% |

$$P_{10-min}[k] = \max_{i \in [k-10, k]} \{P_{TL}[i]\} - \min_{i \in [k-10, k]} \{P_{TL}[i]\} \quad (21)$$

$$P_{Fluc}(k_1, k_2) = \sum_{k=k_1}^{k_2} P_{10-min}[k] \quad (22)$$

A control strategy of the present disclosure respectively optimizes a start-stop frequency of a heat pump cluster and the charge-discharge conversion cycles of the storage battery using a simulated annealing algorithm and power adjustment of the heat pump cluster. Situation results of four control strategies, a condition 1 with no simulated annealing optimization and no power adjustment of the heat pump, a condition 2 with the simulated annealing optimization and no power adjustment of the heat pump, a condition 3 with no simulated annealing optimization and the power adjustment of the heat pump, and a condition 4 with the simulated annealing optimization and the power adjustment of the heat pump, are compared, and the results are shown in table 3. The comparison of condition 1 and condition 2 and the comparison of condition 3 and condition 4 show that with the simulated annealing optimization, the optimized start-stop frequency of the heat pump tends to be consistent without affecting the charge-discharge conversion cycles of the storage battery. The comparison of condition 1 and condition 3 and the comparison of condition 2 and condition 4 show that the power adjustment of the heat pump effectively reduces the charge-discharge conversion cycles of the storage battery. The simulation results show that the simulated annealing optimization and the power adjustment of the heat pump may independently and effectively optimize the start-stop frequency of the heat pump cluster and the charge-discharge conversion cycles of the storage battery respectively without increasing the average start-stop cycles of the heat pump.

TABLE 3

Simulation result statistics

| | Condition 1 | Condition 2 | Condition 3 | Condition 4 |
|---|---|---|---|---|
| Charge-discharge conversion cycles of the storage battery | 128 | 126 | 26 | 32 |
| Average start-stop cycles of the heat pump | 11.56 | 12.16 | 11.23 | 11.71 |
| Variance of start-stop cycles of the heat pump | 4.49 | 0.44 | 4.37 | 0.37 |

Figure 9:
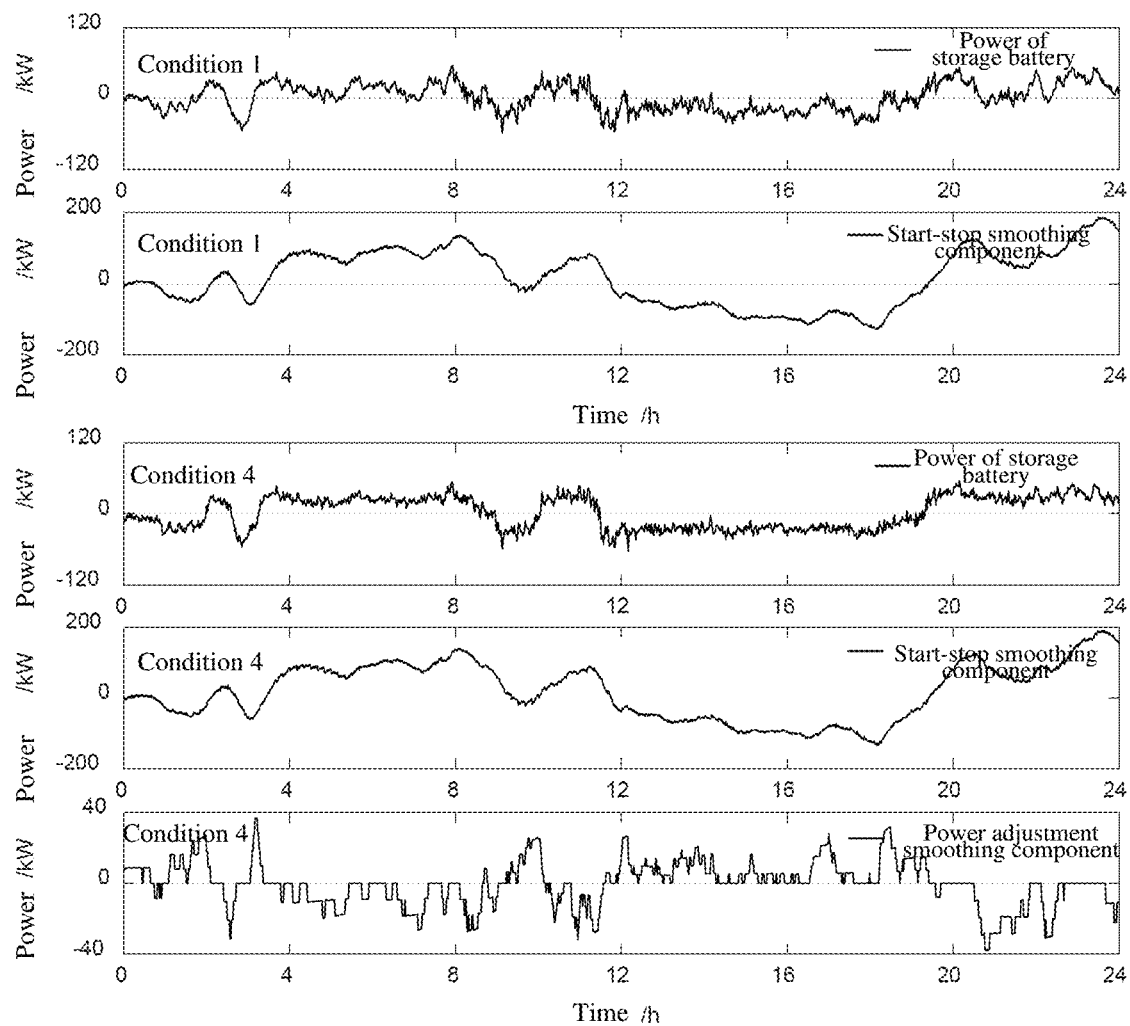
FIG. 9 is a schematic diagram illustrating storage battery heat pump cluster smoothing under conditions 1 and 4 according to an embodiment of the present disclosure.

Curves of the storage battery power and the heat pump cluster smoothing components in conditions 1 and 4 are shown in FIG. 9. The comparison in FIG. 9 shows that the storage battery maintains its output in a charge or discharge state for a long time under the optimization of the power adjustment of the heat pump and will not frequently transit between the charge and discharge states when medium and high frequency fluctuating power is smoothed. Meanwhile, the power adjustment of the heat pump only takes effect when the charge or discharge power of the storage battery drops, and if the storage battery remains in the charge or discharge state, the power adjustment smoothing component is 0.

Figure 10:
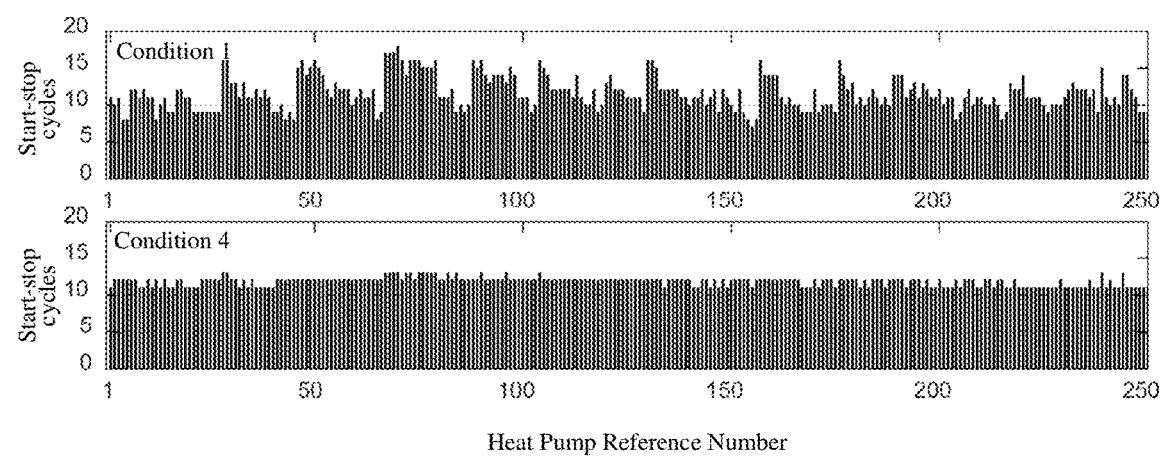
FIG. 10 is a statistical diagram illustrating start-stop cycles of a heat pump under conditions 1 and 4 according to an embodiment of the present disclosure.

Because the rated power of the heat pumps, the volumes of the matching water tanks and the thermal loads of the users are different, a difference of the start-stop frequency of the heat pump in condition 1 is shown in FIG. 10 according to only a start-stop strategy of a temperature index. Through the simulated annealing algorithm, the control strategy of the present disclosure reduces the control of the heat pumps with a high start-stop frequency.

What is claimed is:

1. A method for smoothing a link-line power of an electrothermal microgrid using a thermal storage heat pump cluster, comprising determining a link-line power control target of the microgrid, a heat pump cluster start-stop control layer, a heat pump cluster power adjustment layer, and a storage battery smoothing adjustment, wherein a link-line power control cycle is divided into a number of $T_D$ time points, let k denote discrete time, where $k \in [1, T_D]$, then each control cycle comprises the following steps:

(1) a current link line power control target $P_{Tar}[k]$ is determined based on an original link-line power $P_{TLO}[k]$ and an energy storage state $SOC_{all}[k-1]$ of the storage battery and the heat pump cluster at a last time point, and a link-line fluctuating power $P_{flu}[k]$ is obtained based on $P_{Tar}[k]$ in conjunction with the original link-line power $P_{TLO}[k]$, and the fluctuating power is then subjected to low-pass filtering before a smoothing task $P_{fl\_HP}[k]$ is pre-distributed to the heat pump cluster according to the energy storage states of the storage battery and the heat pump cluster;

(2) the heat pump cluster start-stop control layer makes a heat pump cluster start-stop scheme, and a start-stop state $s_i[k]$ of the heat pump cluster and a heat pump cluster start-stop smoothing component $P_{HP\_sw}[k]$ are determined according to $P_{fl\_HP}[k]$, wherein i is a reference number of the heat pump;

(3) a remaining fluctuating power $P_{flu\_rem}[k]$ is obtained based on the link-line fluctuating power $P_{flu}[k]$ and the heat pump cluster start-stop smoothing component $P_{HP\_sw}[k]$, then the heat pump cluster power adjustment layer smooths some medium and low frequency components and determines a heat pump cluster power adjustment smoothing component $P_{HP\_adj}[k]$ with respect to a storage battery output optimization target based on $P_{flu\_rem}[k]$, then the heat pump cluster start-stop smoothing component $P_{HP\_sw}[k]$ and the heat pump cluster power adjustment smoothing component $P_{HP\_adj}[k]$ are combined and entered into the heat pump cluster to output a heat pump cluster smoothing component $P_{HP\_f}[k]$;

(4) the storage battery simultaneously undertakes a smoothing task of the remaining fluctuating power, the heat pump cluster start-stop smoothing component $P_{HP\_sw}[k]$ and the heat pump cluster power adjustment smoothing component $P_{HP\_adj}[k]$ are combined and then further combined with the link-line fluctuating power $P_{flu}[k]$ and then entered into the storage battery to output a storage battery smoothing component $P_{ess}[k]$ to complete the smoothing of the fluctuating power in the control cycle.

2. The method of claim 1, wherein in step (1) a link-line power, when a microgrid control center does not participate in the adjustment and a load of the heat pump cluster accurately tracks a thermal load of a user, is recorded as the original link-line power $P_{TLO}$, the link-line power control target is recurred according to the following formula (8):

$$P_{Tar}[k]=(1-m[k])P_{Tar}[k-1]+m[k]\cdot P_{TLO}[k] \qquad (8)$$

where $P_{Tar}[k]$ is the link-line power control target, $P_{Tar}[k-1]$ is a control target at the last time point, m is a variable exponential smoothing parameter; when m increases, a capability of tracking link-line real-time power is enhanced and the fluctuating power that needs to be smoothed is reduced; when m decreases, a curve of the link-line power control target is smoother; and at each of the $T_D$ time points, a difference between the original link-line power and the link-line power control target is taken as the fluctuating power, and the fluctuating power at a time point k is calculated according to the following formula (9):

$$P_{flu}[k]=P_{Tar}[k]-P_{TLO}[k] \qquad (9).$$

3. The method of claim 1, wherein in step (1), the smoothing task $P_{fl\_HP}[k]$ is pre-distributed to the heat pump cluster and heat pump cluster start-stop control is used for smoothing only a low frequency fluctuating power, let $\lambda_1$ denote a low-pass filter constant and $\Delta t$ denote a control time cycle, then the low frequency fluctuating power $P_{fl}[k]$ is recurred according to the following formula (10):

$$P_{fl}[k] = \frac{\lambda_1}{\Delta t + \lambda_1}P_{fl}[k-1] + \frac{\Delta t}{\Delta t + \lambda_1}P_{flu}[k]; \qquad (10)$$

and the low frequency fluctuating power is distributed according to the energy storage states of the storage battery and the heat storage cluster as shown in the following formulas (11) and (12):

$$\begin{cases} P_{fl\_HP}[k] = \frac{1}{1+x}P_{fl}[k] \\ x = \begin{cases} \beta SOC_{ess}/\overline{SOC}_{HP} \\ \beta(1-SOC_{ess})/(1-\overline{SOC}_{HP}) \end{cases} \end{cases} \qquad (11)$$

$$\beta = \frac{S_{ess}}{S_{HP}/COP_{HP}} \qquad (12)$$

wherein $\beta$ is a capacity ratio of the storage battery to the heat pump cluster, $SOC_{ess}$ is a capacity of the storage battery, $\overline{SOC}_{HP}$ is an average energy storage state of thermal storage, and $COP_{HP}$ denotes an energy efficiency ratio coefficient of the heat pump.

4. The method of claim 1, wherein in step (2) the heat pump cluster start-stop control layer is implemented as follows:

after acquiring the smoothing task pre-distributed to the heat pump cluster, the heat pump start-stop control layer cluster selects a heat pump to start and stop the heat pump thus changing a load of the heat pump cluster to meet a fluctuation smoothing requirement, wherein a change amount $\Delta P_{HP}$ of the load of the heat pump cluster is obtained according to the following formula (13), wherein $Q_L[k]$ is a current practical thermal load of a user, $P_{HP\_N}[k-1]$ is the load of the heat pump cluster at the last time point without taking into account the power adjustment of the heat pump, and $COP_{HP}$ denotes an energy efficiency ratio coefficient of the heat pump:

$$\Delta P_{HP}=(Q_L[k]/COP_{HP}+P_{fl\_HP}[k])-P_{HP\_N}[k-1] \qquad (13); \text{ and}$$

a heat pump cluster start-stop control strategy is divided into two parts, where a first part is to formulate the start-stop scheme based on a water temperature index and a second part is to optimize the start-stop scheme in terms of a start-stop frequency consistency of the heat pump; wherein a greedy algorithm is adopted in the first part of the start-stop control strategy: when a heat pump needs to be stopped, a heat pump with a higher water temperature is preferentially stopped, and when a heat pump needs to be started, a heat pump with a lower water temperature is preferentially started; a heat pump statistical curve is drawn by collecting information of a heat pump in a non-locking state, and the heat pump cluster start-stop scheme is made, and a temperature $T_{set}$ at an intersection of $\Delta P_{HP}$ and the curve is acquired, and a heat pump in a temperature interval is stopped or started to change the load of the heat pump cluster; and in the second part of the start-stop control strategy, the obtained start-stop scheme is further optimized by designing a simulated annealing algorithm, and an optimization target fit is set according to the following formula (14) without increasing charge-discharge conversion cycles of the storage battery and average start-stop cycles of the heat pump:

$$fit=\text{varience}+\gamma(P_{fl\_HP}[k]-P_{HP\_sw}[k])^2 \qquad (14);$$

wherein varience and $P_{HP\_sw}[k]$ are respectively a variance of start-stop cycles of the heat pump and the start-stop smoothing component of the heat pump cluster after the current start-stop scheme is adopted, $\gamma$ is a weight constant, and $P_{HP\_sw}[k]$ is shown in the following formula (15), wherein $s_i$ denotes a start-stop state of the heat pump (1 denotes starting and 0 denotes stopping) and $P_{i\_N}$ denotes a rated working power of an i-th heat pump:

$$P_{HP\_sw}[k] = \sum_{i=1}^{N} P_{i\_N} \cdot s_i[k] - Q_L[k]/COP_{HP}. \quad (15)$$

5. The method of claim 4, wherein drawing the heat pump statistical curve comprises: dividing the heat pump in the non-locking state into a set of heat pumps in a started state and a set of heat pumps in a closed state, wherein an abscissa is temperature and an ordinate is power; when $\Delta P_{HP}<0$, stopping the heat pump and collecting information of the heat pump in the started state: for any point $(x_1, y_1)$ on the curve, $y_1$ denotes a sum of rated power of heat pumps with a water temperature higher than $x_1$; when $\Delta P_{HP}>0$, starting the heat pump and collecting information of the heat pump in the closed state: for any point $(x_2, y_2)$ on the curve, $y_2$ denotes a sum of rated power of heat pumps with a water temperature lower than $x_2$.

6. The method of claim 1, wherein in step (3), the heat pump cluster power adjustment layer is implemented as follows:

after a heat pump cluster start-stop control scheme is determined, the remaining fluctuating power of the heat pump is calculated according to the following formula (16), and a pre-output target $P_{ref}[k]$ of power adjustment of the heat pump cluster is determined according to the following formula (17):

$$P_{flu\_rem}[k] = P_{flu}[k] - P_{HP\_sw}[k] \quad (16)$$

$$\begin{cases} P_{ref}[k] = P_1[k] - P_2[k] \\ P_1[k] = (1-a)P_1[k-1] + aP_{flu\_rem}[k] \\ P_2[k] = (1-a+b[k])P_2[k-1] + (a-b[k])P_{flu\_rem}[k] \end{cases} \quad (17)$$

wherein $P_1[k]$ and $P_2[k]$ are first-order exponential smoothing of the remaining fluctuating power, a is an exponential smoothing constant, $b[k]$ is a variable smoothing parameter and is adjusted as shown in the following formula (18); when the remaining fluctuating power is lower than a threshold constant $P_{th}$ and approaches 0, $b[k]$ is increased to generate a power adjustment output of the heat pump cluster so that the storage battery stays in a charge or discharge state and does not need to continually convert between the charge and discharge states due to power fluctuations:

$$b[k] = \begin{cases} a(1 - P_{flu\_rem}[k]/P_{th})^2, & |P_{flu\_rem}[k]| < P_{th} \\ 0, & \text{otherwise} \end{cases} \quad (18)$$

then the heat pump cluster power adjustment layer first determines an adjustable capacity $P_{adj\_S}$ of the heat pump cluster and then determines an adjustment proportion order $\varepsilon[k]$ according to the pre-output target, as shown in the following formula (19):

$$\begin{cases} P_{adj\_S}[k] = \sum_{i=1}^{N} P_{i\_N} \cdot s_i[k] \cdot s_i[k-1] \\ \varepsilon[k] = f_3\left(\dfrac{P_{ref}[k]/P_{adj\_S}[k]}{\eta}\right)\eta \end{cases} \quad (19)$$

wherein $f_3$ is an amplitude limiting step function, $\eta$ is a maximum adjustable proportion of the power adjustment of the heat pump, and a local controller of the heat pump responds to the order to complete the power adjustment;

wherein the power adjustment smoothing component of the heat pump cluster is calculated according to the following formula (20):

$$P_{HP\_adj}[k] = \varepsilon[k] \cdot P_{adj\_S}[k] \quad (20); \text{ and}$$

control of the heat pump cluster in one control cycle is completed and in step (4), an output of the storage battery is adjusted to smooth the remaining fluctuating power.

7. An apparatus for implementing the method for smoothing a link-line power of an electrothermal microgrid using a thermal storage heat pump cluster according to claim 1, the apparatus comprising a strategy information collection module, a heat pump cluster start-stop control strategy module, a heat pump cluster power adjustment strategy module, and a storage battery power adjustment strategy module, wherein the above-recited modules are computer storage media, which is configured to store a computer program which, when executed, implements the following method:

the strategy information collection module acquires an input signal required by the smoothing method from a microgrid energy management system, the input signal comprising an original link-line power and an energy storage state of the storage battery and the heat pump cluster at a last time point, thus implementing step (1) of claim 1;

the heat pump cluster start-stop control strategy module implements step (2) of claim 1;

the heat pump cluster power adjustment strategy module implements step (3) of claim 1; and the storage battery power adjustment strategy module implements step (4) of claim 1;

wherein output information of the heat pump cluster start-stop control strategy module, the heat pump cluster power adjustment strategy module, and the storage battery power adjustment strategy module is entered into the microgrid energy management system for the electrothermal microgrid to control the storage battery and the heat pump cluster so as to smooth the link-line power.

* * * * *